United States Patent Office 2,747,368
Patented May 29, 1956

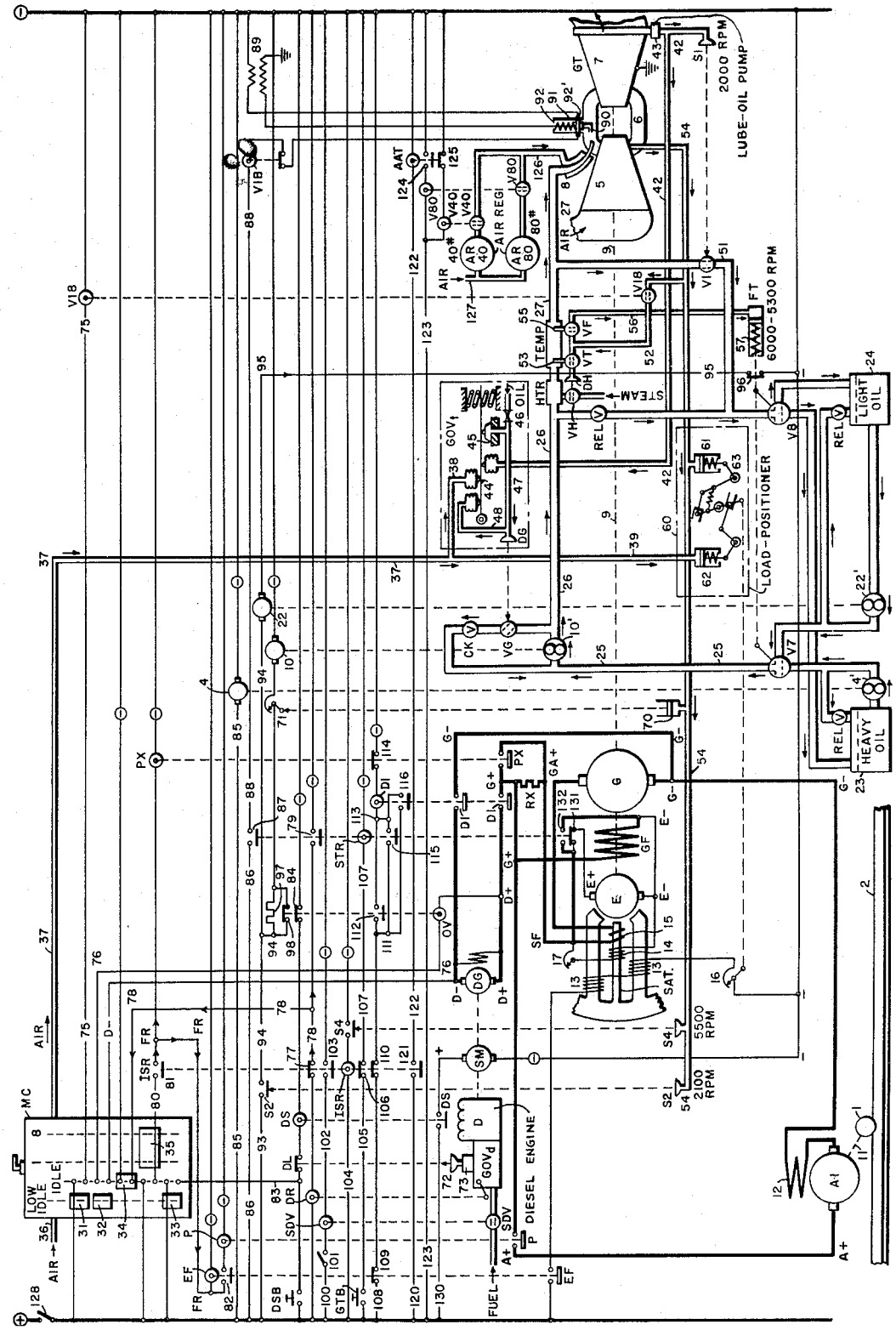

2,747,368

LOW-SPEED IDLING OF ENGINES

John J. Stamm, Export, Pa., assignor to Westinghouse Electric Corporation, East Pittsburgh, Pa., a corporation of Pennsylvania Application November 23, 1954, Serial No. 470,607

11 Claims. (Cl. 60—39.18)

My invention relates to gas turbines, or other fuel-consuming engines which normally require a certain costly idling-speed fuel-input, in order to maintain a desirable self-sustaining idling-speed, with an adequate factor of safety. My present invention has to do with a low-speed idling-means, for operating such an engine at an abnormally low idling speed, substantially below the aforesaid desirable self-sustaining idling speed, with assistance from a source of external power which is cheaper than the operation of the main engine at said desirable self-sustaining idling speed.

The importance of my invention will be appreciated when it is realized that a typical normal idling speed of a gas turbine is 87% of the full speed of the engine. This is because a turbine type of engine has an air-compressor which requires a considerable amount of power. The turbine has to first drive its own air-compressor at a speed which is high enough to maintain such operation, before the turbine can begin to supply useful external loads; and the power-output or load-capability of the turbine then increases at a high power of the speed, approaching the sixth power of the speed. The gas turbine uses relatively cheap fuel-oil, and is quite efficient when operating at its maximum safe speed and output, but its 87% idling-speed makes its idling-operation so expensive as to cancel its low-cost full-speed advantage, unless the idling periods can be kept to a minimum.

My invention is particularly applicable to gas-turbine locomotives. The general object of the invention is to reduce the high idling-fuel cost, which has heretofore been about 25% of the full-load fuel-requirements. Heretofore, the gas-turbine locomotive has had its principal application to railroad-lines having long hauls and short stops or waiting-times or stand-by periods at the various stations. It is obvious that the gas-turbine locomotive would become attractive to more railroads if the fuel-consumption could be substantially cut during station waiting-times of from a half hour to an hour.

In accordance with my present invention, I provide an auxiliary power plant, or I enlarge the auxiliary power-plant which is commonly provided on locomotives, this auxiliary power plant being driven by an engine or prime mover of a type which is efficient at speeds which are lower than the normal idling speed of the gas turbine of the main power plant. I use this efficient auxiliary power-plant to operate the main turbine or engine at an abnormally low idling speed, which can be 40% of the full speed, as compared with the normal idling speed of 87%, or the low idling speed may in some cases be reduced even to 20% or 30% of the full speed of the turbine. I preferably maintain a very much reduced fuel-input into the turbine, during the low-speed idling-operation, and I preferably keep this fuel-input ignited, in order to keep the turbine warm and ready for instant acceleration and power-operation, throughout the low-idling operation, thus reducing the time required for the locomotive-operator to accelerate the unit back to its normal idling speed, when it is desired to again use the turbine to supply power to an external load-device, such as the locomotive drive-wheels.

With the foregoing general objects in view, as well as many ancillary objects which will be set forth hereinafter, my invention consists in the systems, circuits, apparatus, combinations, parts, and methods of design and control, which are hereinafter described, and illustrated in the accompanying drawing, the single figure of which is a very much simplified diagrammatic view of circuits and apparatus, embodying my invention in an illustrative preferred form of embodiment, omitting many known parts, interlocks and safeguards which would be needed in any practicable application of the invention, but which are well understood to those skilled in the art and are not needed to an understanding of the novel features of my present invention.

As shown by heavy lines in the drawing, I provide a main electric drive, which consists of one or more main, direct-current generators G, which energize one or more traction-motors which are represented by a motor-armature A1. The traction-motor A1 is connected to a pair of drive-wheels 1, which are supported on rails 2, this being intended as a diagrammatic representation of a locomotive or other self-propelled vehicle, which may be considered as being representative of any power-plant of this general nature. The generator G is normally driven by an engine or prime mover, which is illustrated in the form of a gas turbine GT, comprising an air-compressor 5, a combustion-chamber 6, and a turbine-proper 7. Fuel is fed into the combustion-chamber 6 by a suitable combustion-means, represented by a nozzle or burner 8, which injects a finely atomized spray of fuel-oil into the combustion-chamber 6, where said oil burns in compressed air which is supplied by the compressor 5.

The gas turbine GT is provided with suitable mechanical connection-means, which is illustrated as a shaft 9, which serves as a drive-connection to the main generator G, and usually also as a drive-connection to certain other power-consuming means, such as an exciter E, and usually also other auxiliary devices which are commonly provided on the locomotive but which are not illustrated in my drawing.

The traction-motor A1 is shown as being preferably, although not necessarily, in the form of a series direct-current motor, driving its own axle 11 on which is mounted a pair of drive-wheels 1. Each motor is provided with a series field-winding 12.

According to the conventional showing which I use in the drawing, the various relays, switches, contactors, and other magnetic operating-devices of my apparatus are all represented as having operating solenoids, which are represented as circles, and which are energized from battery-terminals (+) and (—). Inside of each coil is a smaller circle, representing an armature, which is considered as being gravity-biased, and as being picked up by a suitable energization of the associated coil, so as to lift the operating-stem which is actuated by that coil, and which is shown by means of a vertical dotted line. These vertical dotted relay-stems are intended as diagrammatic representations of the interconnection between the various coils and their associated contact-members or other parts. As a further convention for illustrating the interconnection or interrelationship between the various parts of any electrically operated element, I employ the same symbol as referring to the different parts of any given element. All relay-coils and other magnetic operating-coils are illustrated as being deenergized, so that the controlled parts are shown in the positions which they occupy in the unenergized state.

The main engine-driven generator G is provided with a voltage-energized field-winding GF, by which term I intend to refer to any type of field-winding which is energized by having a predetermined voltage applied thereto, as distinguished from having a predetermined current driven therethrough, whether said field-winding is self-excited or separately excited. In the preferred, illustrated, form of embodiment of my invention, the generator-field GF is a separately excited winding, which is normally excited by the engine-driven exciter E. In its broadest sense, the engine-driven exciter E may be regarded as any direct-current exciting-means which has a speed-responsive means for making the voltage-output of the exciting-means vary in response to the speed of the engine.

The speed-responsive design of the exciter E is preferably, although not necessarily, of such a nature as to make the characteristic power-versus-speed curve of the generator G approximate the characteristic power-versus-speed curve of the engine GT during the power-operation of the equipment. To this end, the exciter E is shown as a 2-pole generator having a 6-pole field, only half of the field-poles being illustrated, so that each of the two poles of the exciter consists of three poles or pole-parts, the center pole of the three poles being saturable, as is now well known in the art, and as is shown also in the two Gerald F. Smith patents, 1,730,340, granted October 1, 1929, and 2,157,869, granted May 9, 1939. Thus, the exciter E is provided with a separately excited 4-pole winding 13, which is mounted on the two outermost or non-saturating pole-parts of each of the two poles of the machine, a cumulative self-excited 2-pole winding 14 which is mounted on the central or saturable pole-parts of each of the two poles of the machine, and a bucking series winding 15 which is energized in series with the generator-armature G, and which is mounted on the central or saturable pole-parts in such polarity that it bucks or reduces the excitation of the exciter in accordance with the amount of generator-current which is flowing at any moment.

It is also a necessary feature of the exciter or exciting-means E, that it should have a controlling-means, for adjusting the voltage-level of the exciting-means. In the drawing, this voltage-adjusting means is in the form of a load-positioning field-rheostat 16, in series with the 4-pole field-winding 13, which is energized across the battery-terminals (+) and (—). A second voltage-adjusting means is provided, in the form of a second field-rheostat 17, which is in series with the self-excited 2-pole winding 14 which is connected across the exciter-terminals E+ and E—. This second field-rheostat 17, while having an effect upon the voltage-level of the exciter E, has a probably stronger effect upon the shape of the voltage-versus-speed curve of the exciter.

The main armature-circuit of the generator G is shown in heavy lines in the drawing. Starting at the positive generator-armature terminal GA+, this circuit may be traced through the series exciter-winding 15 to the series-field terminal SF, thence through a special temporary-duty series resistance RX, and thence to the positive generator-terminal G+. This series armature-circuit resistance RX is a special feature which has been added for the purpose of making it possible to operate the generator G as a series-shunted starting-motor. This series resistance RX is normally short-circuited by the make-contacts PX of an auxiliary relay or contactor bearing the same letters, namely, PX. Normally, therefore, that is, during the normal power-operating condition of the equipment, when the generator G is delivering power to the motor A1, the auxiliary contactor PX is energized and its contact PX is closed, thus joining the conductors SF and G+. The significance of this will be discussed after the rest of the generator armature-circuit has been described. The main generator armature-circuit continues, from the positive terminal G+ of the generator, to a switch-contact P, thence to the positive motor-terminal A+, then through the motor A1, and thence to the negative generator-terminal G—.

Essentially, the generator G is excited by a voltage-type field-winding GF, by which I mean a winding which is excited by having a voltage applied across its terminals, as previously explained. When an exciter E is used, as shown, this voltage-energized generator-field winding GF is energized from the terminals of the exciter E. In the illustrated form of embodiment of my invention, the negative terminal of this generator-field winding GF is connected to the negative exciter-terminal E—, and the positive terminal of said generator-field winding is connected to the positive generator-terminal G+.

I have described the generator field-winding GF as a principal field-excitation means for the generator G. Ordinarily, the generator will be provided with one or more other windings, such as a series compensating winding, or a series commutating-winding or a series compounding winding (none of which is shown), and I wish it to be understood that any one or more of such windings, or any other windings, may be used within the concept of my invention, so long as the principal field-excitation of the generator comes from the voltage-energized winding GF.

The most successful operation of my invention is related to, and to some extent coordinated with, the control and operation of the gas turbine GT, and hence I have diagrammatically indicated some of the essential or desirable features of this gas-turbine control, in my drawing. As described and claimed in an application of J. O. Stephens and myself, Serial No. 344,532, filed March 25, 1953, the gas turbine GT requires two kinds of fuel-oil, namely, an inexpensive heavy fuel-oil, on which the turbine usually runs, and a more expensive light fuel-oil, usually referred to as diesel oil, which is used for starting purposes as well as for shut-down purposes. This is so, because the heavy oil needs to be heated, and if it were allowed to cool in the piping which is connected with the turbine, it would become so stiff that a subsequent starting-operation would be well-nigh impossible.

When the gas-turbine assembly GT is to be operated, during stand-by times, at an abnormally low idling-speed, in accordance with my present invention, it is highly desirable to transfer from the heavy oil to the light oil, before entering into the low-idling condition.

I have thus shown my gas turbine GT as being provided with either one of two kinds of fuel-oil, which are represented as being contained in a heavy-oil tank 23, and a light-oil tank 24, shown at the bottom center portion of the figure. The heavy fuel-oil is taken from the heavy-oil tank 23 by means of a heavy-oil circulating-pump 4', and delivered to a main fuel-supply pipe 25 through a three-way fuel-transfer valve V7. In like manner, the light fuel-oil is delivered, from the tank 24, by means of a light-oil pump 22', which delivers this oil to the man fuel-supply pipe 25, through another position of the three-way fuel-transfer valve V7. The main fuel-supply pipe 25 feeds a main fuel-pump 10', which delivers fuel-oil through a pipe 26 to a heater HTR, and thence to a temperature-control chamber TEMP, and finally to a fuel-supply pipe 27 which supplies the burner 8 of the gas turbine GT.

The operation of the main power-plant, comprising the gas turbine GT and the main generator G, is under the control of a master controller MC, which is shown at the top of the drawing. In accordance with my invention, the main speed-controlling drum of this controller (which is all that I have shown in the drawing) is provided with an extra "low idle" notch, which is before the usual "idle" notch, which is in turn before the several on-position notches which are indicated as notches 1 to 8. A simplified form of controller is shown, in which there are provided three low-idling contact-segments 31, 32 and 33, which are closed in the low-idling position of the master controller, an idle-position contact-segment 34, which is closed in the idle position of the controller, and an on-position contact 35, which is closed when the master controller is in only one of its on-positions, which are numbered from 1 to 8 in the illustrated example. Each of the controller contact-segments is open, except in the named controller-positions in which the several contacts are closed. The master controller MC is shown also as having an air-inlet pipe 36 for pressurized air, and a controlled-pressure air-outlet pipe 37, which is shown as having a branch 38 for controlling the prime-mover governor GOVt, and a second branch 39, the purpose of which will be subsequently described.

The turbine-governor GOVt controls the rate of fuel-supply to the burner 8 of the gas turbine GT. In the illustrated form of the invention, the fuel-pump 10′ is of a constant-delivery type, which forces fuel-oil through it at a constant rate, as long as the speed of the pump is held constant. This pump is bypassed by a governor-valve VG and a check-valve CK. The governor-valve VG is automatically adjusted, as to the amount of its valve-opening, by means of the governor GOVt.

No particular form of governor GOVt is absolutely required, save that it should have a differential response to a speed-setting control-variable, which, in the illustrated case, is a variable air-pressure in the controller air-pipe 37. In the governor, the effect of this controller air-pressure is opposed by a variable quantity which is responsive to a function of the speed of the gas turbine, such as the lubricating-oil pressure which is contained in a lube-oil pipe 42, wherein the oil-pressure is produced by a lube-oil pump 43 which is driven by the turbine GT, so as to develop a hydraulic pressure which is a function of the turbine-speed. The particular governor which I have illustrated is similar to the one which is described and claimed in my copending application on locomotive-control, Serial No. 340,840, filed March 6, 1953.

Essentially, this governor GOVt uses a pivoted beam 44, which is differentially responsive to the input controller-pressure in the pipe 37—38, and the lube-oil pressure in the pipe 42. The governor controls the pressure on a hydraulic cup-type device 45 which controls the rate of flow of pressurized input-oil through a choke-valve 46, thereby controlling the oil-pressure drop through this choke-valve, and thus controlling the output oil-pressure of the governor, in the output-pipe 47. The operation of the governor is stabilized by suitable feedback-means 48.

Normally, the output-pipe 47 of the governor GOVt supplies oil, under a controlled variable pressure, to a governor-diaphragm DG, which in turn actuates the governor-controlled bypass-valve VG. This is the control which is effected during the normal power-operation of the equipment.

The supply-pipe 27 for the turbine-burner 8 is provided with a shutdown-valve, schematically shown at V1, whereby the fuel-input into the engine may be bypassed from the engine and drained into a drain-pipe 51, which leads to a three-way fuel-transfer drain-valve V8, through which the fuel may be drained either into the heavy-oil tank 23 or into the light-oil tank 24, according to the position of the drain-valve V8. The shutdown-valve V1 is illustrated as being automatically closed when the engine-speed reaches a value of 2,000 R. P. M. or other suitable value which is preferably less than the engine-starting speed at which fuel is first admitted to the engine during the starting operation of the invention. This automatic speed-response is illustrated as being obtained from a speed-responsive diaphragm S1, which is fed from the lube-oil pipe 42.

The heater HTR is provided for the purpose of raising the temperature of the heavy fuel-oil to a suitable combustion-feeding temperature, such as 250° F., for example. This heating is in addition to the preliminary heating of the heavy oil which is ordinarily maintained in the heavy-oil tank 23. The said heater HTR may be heated by steam, which is admitted through a heater-valve VH which is under the control of a heater-controlling diaphragm DH, which is supplied with compressed air, from a pipe 52, under the control of a thermally controlled valve VT which is controlled by a thermometer or other thermal device 53 in the temperature-controlling chamber TEMP, this thermometer being set to turn the valve VT on or off at or near the desired temperature of 250°, or such other value as may be chosen.

The compressed-air pipe 52, which has just been mentioned, may be any fluid-pressure pipe, or other means, which is responsive to a function of the speed of the engine GT. This pipe is illustrated as being supplied from a compressor-pressure pipe 54, from the high-pressure end of the compressor part 5 of the gas turbine.

As explained in my Patent 2,546,023 of March 20, 1951, it is advantageous to use this compressor-pressure pipe 54 also as a speed-responsive means, for responding to a function of the engine-speed, because it automatically varies its response to the engine-speed in somewhat the same manner in which the power-capacity of the engine varies with variations in the ambient air-temperature and the ambient air-density in which the engine is operating.

This compressor-pipe 54 is connected to the inlet pipe 52 of the thermally controlled valve VT, through a fuel-transfer-controlling air-valve V18, which is shown as being actuated from its closed position to an open position, by means of the energization of an actuating solenoid or coil V18.

The temperature-controlling chamber TEMP is also provided with a second thermometer or other thermal device 55, which controls an auxiliary fuel-transfer controlling-valve VF, causing this auxiliary valve to open in response to the previously mentioned fuel-oil temperature of 250° F. (for example), so as to thereupon connect the speed-responsive air-pressure pipe 52 to a pipe 56 which is connected to a main fuel-transfer selector-valve actuator-mechanism FT. When an adequate air-pressure is supplied to this fuel-transfer mechanism FT, corresponding to a desirable normal idling-speed of, say, 6,000 R. P. M., of the engine, said fuel-transfer mechanism moves the three-way fuel-selector valves V7 and V8 from their light-fuel position to their heavy-fuel position. When the engine-speed drops from 10 or 15% below this normal desirable idling speed, say when the engine-speed drops to 5,300 R. P. M., more or less, a spring 57 in the transfer-mechanism FT returns the same to its normal deenergized position, in which it resets the fuel-selector valves V7 and V8 at their light-fuel positions.

During the normal power-operation of the equipment, therefore, with the three-way fuel-valve VF in its actuated position, the governor GOVt causes the heavy fuel-oil to be fed into the engine GT at such rates as may be necessary to produce a desirable correspondence between the air-pressure in the controller air-pipe 37 and a function of the engine-speed.

In the particular form of embodiment of my invention, which is illustrated in the drawing, the exciter E is designed and adjusted so that it inherently causes the output of the generator G to fairly closely match the maximum-efficiency load which the engine GT is capable of delivering at any given engine-speed. In order to make it possible to readjust the voltage-level of the rising voltage-versus-speed characteristic of the exciter E, so as to thereby make adjustments in the output-versus-speed characteristic of the generator G, my illustrated equipment embodies the previously mentioned load-positioning field-rheostat 16 for controlling the exciter-excitation. For automatically adjusting the settings of this load-positioning rheostat 16, I have illustrated the use of a load-positioner mechanism 60 which is of the type shown in my copending locomotive-control application, Serial No. 340,840, although I am not limited to this precise form of means for causing the generator-output to adequately approximate the most efficient engine-loading, at each engine-speed over a substantial portion of the operative speed-range of the engine. The essential thing is to keep the generator-loading adjusted so that it matches the desired optimum-efficiency loading of the engine, throughout the essential operative speed-range of the engine, however this adjustment may be accomplished, as it is obvious that many control-devices may be devised to effect this result.

The illustrated load-positioner 60 is a duel-operated equipment which primarily adjusts or "positions" the load-positioner rheostat 16, in accordance with a function of the engine-speed, in such manner as to cause the excitation-level of the exciter to have known, predetermined settings which are known to approximate the most efficient engine-loadings at each engine-speed, throughout the essential speed-range of the engine while the engine is operating in its normal manner as a fuel-consuming source of power. A second adjustment, which is built into the dual-actuated load-positioner 60, is in the form of a second actuating-means which is responsive to a sudden drop in the controller air-pressure which is applied to the governor $GOV_t$, so that the generator-output can be reduced quickly, when occasion demands, without having to wait for the speed of the engine to reduce in response to the governor.

Briefly described, the load-positioner 60 has a speed-responsive actuator which is shown in the form of a spring-biased piston 61, and a controller-responsive actuator which is shown in the form of a spring-biased piston 62, with a suitable lost-motion mechanism 63 between them, as described and claimed in my locomotive-control case. The speed-responsive piston 61 is shown, in a simplified illustration, as receiving its energization from the compressor-pressure pipe 54, through any suitable means such as a direct connection. The controller-responsive piston 62 receives its control from the controller air-pipe branch 39 during the normal power-operation of the equipment.

A characteristic feature of my invention is the provision or use of an auxiliary power-plant which serves as an economical source of power for assisting in the low-idling operation of the gas turbine GT. This economical auxiliary source is illustrated as an auxiliary power-plant comprising a diesel generator DG, driven by a diesel engine D, which may be taken as respresentative of any auxiliary source of power, preferably of a type having a constant-horsepower output, or a type which delivers an output which is of an approximately constant horsepower, for any given setting of its governor $GOV_d$.

The diesel generator DG is a direct-current generator having its positive and negative terminals D+ and D— respectively connected to the positive and negative generator-terminals G+ and G—, through the main contacts D1 of a diesel-generator switch or contactor D1. In a general sense, the diesel-generator DG may be considered as being respresentative of any suitable direct-current source which can be used for driving the main generator G as a motor to start the turbine GT in the first place, and to assist in the low-speed idling-operation of the turbine after it is once started, and when the engineman moves his master-controller to the low-idling position, as will be subsequently described.

In the drawing, the main circuit for the diesel generator DG is shown in heavy lines. This circuit is traceable from the positive diesel-generator terminal D+, through a contactor-contact D1, to the positive generator-terminal G+, thence through the special resistance RX, the series-field terminal SF, the series field 15 of the exciter E, the generator-armature terminal GA+, the generator armature G, the negative generator-terminal G—, and another contactor-contact D1 to the negative diesel-generator terminal D—. Whenever the diesel generator DG is thus used, either during the intial starting-operation for the gas turbine GT or during the low-speed assisting-operation for the low-idling operation of the gas turbine GT, the special series resistance RX is connected in series in the armature-circuits of both the diesel generator DG and the main generator G, the auxiliary resistance-shorting contactor PX being in its deenergized or open position during such times.

In addition to the previously described equipment, my illustrated apparatus also includes three speed-responsive devices which are responsive to the speed of the gas turbine GT, as by being energized from the compressor-pressure pipe 54. These are shown as a speed-responsive diaphragm S2 which closes a make-contact S2 when the turbine-speed reaches a value as high as 2100 R. P. M., a speed-responsive diaphragm S4 which closes a make-contact S4 when the turbine-speed reaches as high as 5500 R. P. M., and a piston 70 which controls the position of a rheostat 71 according to the air-pressure in the pipe 54, and hence in accordance with the speed of the turbine GT. The diaphragm-operated switch S4 closes whenever the gas turbine attains a speed which is as high as the normal idling speed of the turbine, or a speed which is nearly as high as the normal idling speed of the turbine. This contact S4 is in series with the operating coil ISR of an idle-speed relay ISR, which has numerous make and break contacts, which will be subsequently referred to.

The illustrated equipment also includes a starting-relay STR for the gas turbine GT, a starting-motor SM for starting the diesel engine D, a diesel-starting relay DS, and a diesel-lube switch DL which is opened under the control of a speed-responsive diaphragm 72 which responds to the pressure of the lubricating-oil pump 73 of the diesel engine D whenever the diesel engine attains an operating speed. The illustrated equipment also includes a diesel-regulator solenoid or magnet DR which is used to adjust the diesel-governor $GOV_d$ to a higher speed, and a shutdown-valve SDV which, when energized, shuts off the fuel-supply to the diesel engine D.

The various control-circuits will be traced, starting at the top of the drawing.

The low-idle contact-segment 31 energizes a conductor 75 which energizes the operating-coil or magnet V18 of the air-valve V18 which shuts off, when energized, so as to deprive the fuel-transfer cylinder FT of air-pressure, thus causing it to return to the illustrated light-oil position.

The second low-idle contact-segment 32 is used to connect the operating coil OV of an overvoltage relay OV across the terminals of the diesel generator DG, this overvoltage relay being set to respond when the diesel generator reaches an operating speed. The energizing circuit for this overvoltage relay OV may be traced from the positive diesel-generator terminal D+, through the OV coil to a circuit 76, thence to the contact-segment 32 and back to the negative diesel-generator terminal D—.

The idle-position contact-segment 34 of the master controller MC is used as one of two means which are provided for temporarily energizing the operating coil or magnet DR of the diesel-regulator DR, which serves to increase the speed of the diesel engine D while the diesel generator DG is bringing, or helping to bring, the speed of the gas turbine GT up to its normal idling-speed. The energizing-circuit for the diesel-regulator coil DR may be traced from the positive battery-terminal (+), through said coil DR to a back-contact 77 of the idle-speed relay ISR, and thence to a circuit or conductor 78, then to the contact-segment 34 and finally to the negative battery-terminal (—). A second branch-circuit of the conductor 78 is continued on, to the negative battery-terminal (—), through a make-contact 79 of the starting-relay STR. In this way, the diesel-regulator magnet DR is energized while the gas turbine is being started, as well as when the master controller is returned from its low-idle position to its idle-position. In either event, the diesel-regulator magnet DR is deenergized, so as to return the diesel governor $GOV_d$ to its lower speed-setting, when the gas turbine GT attains its idling speed, which picks up the speed-switch S4 and energizes the idle-speed relay ISR, which in turn opens its back-contact 77 in series with the diesel-regulator magnet DR.

The on-position contact-segment 35 of the master controller MC is used to energize a conductor 80, which is connected to a make-contact 81 of the idle-speed relay ISR, which in turn energizes an auxiliary positive relaying-circuit FR. A first branch of this circuit FR energizes the operating coil PX of the auxiliary contactor PX which thereupon short-circuits the special series resistance RX in the armature-circuit of the main generator G. A second branch of the circuit FR energizes the operating coil EF of the exciter-field relay EF, which thereupon energizes the four-pole field-winding 13 of the exciter E. This exciter-field relay EF has an auxiliary make-contact 82 which is connected to the auxiliary bus FR, and which energizes the operating coil P of the power-switch P which energizes the traction-motor A1.

The last contact-segment of the master controller MC is the low-idle contact-segment 33, which constitutes one of two different ways for energizing a conductor 83. A second way for energizing this conductor 83 is provided in the form of a diesel-start push button DSB. The circuit 83 continues on, through the normally closed back-contact DL of the diesel-lubrication diaphragm 72, thence to the operating coil DS of the diesel-start relay or contactor DS, and finally, through a back-contact 84 of the overvoltage relay OV, to the negative battery-terminal (—). Thus, the diesel-starting contactor DS is deenergized either when the diesel-engine speed becomes high enough to open the diesel-lube switch DL, or when the voltage of the diesel generator DG becomes high enough to pick up the overvoltage relay OV at a time when the master controller MC is in its idle-position.

Immediately below the auxiliary positive relaying-circuit FR, I have shown a positive battery-circuit 85, which normally energizes the heavy-oil circulating-pump motor 4, which thus normally operates continuously whenever the main power plant is in readiness for operation. This motor 4 drives the heavy-oil pump 4', the function of which is to maintain a certain oil-pressure which is controlled by a relief-valve REL as shown.

The next positive battery-circuit 86 is connected to an auxiliary make-contact 87 of the starting-relay STR, which in turn energizes a circuit 88 which energizes the operating coil of a vibrating relay VIB, which is in series with a spark-plug transformer 89 which energizes a spark-plug 90 for igniting the fuel in the combustion-chamber 6 of the gas turbine GT. The spark-plug 90 is initially disposed within the combustion-chamber 6, but it is carried by a spring-pressed piston 91 in a piston-chamber 92, so arranged that, when the fuel ignites in the combustion-chamber 6 the gaseous pressure in this combustion chamber will press back the spark-plug 90, pushing it out of the direct path of hot gases in the combustion-chamber, so as to avoid an early destruction of the spark-plug contacts. The spark-plug piston 91 also breaks the spark-plug exciting-circuit at 92' when the spark-plug 90 is pushed back into the piston-chamber 92.

The next positive battery circuit 93 energizes an auxiliary positive circuit 94 through the speed-responsive make-contact S2, which closes when the turbine-speed reaches a value high enough to admit of the initiation of fuel-input into the turbine during the starting-process. The auxiliary positive conductor 94 is used, under proper circumstances, to energize both the light-oil circulating-pump motor 22, which drives the light-oil pump 22', and the main fuel-pump motor 10, which drives the main fuel-pump 10'. The circuit for the light-oil circulating-pump motor 22 is completed through a conductor 95, which is connected to the negative battery-terminal (—) through a normally closed back-contact 96 of the fuel-transfer mechanism FT.

The auxiliary positive circuit 94 is shown as also energizing the main pump-motor 10, through a fixed resistance 97 and the speed-controlled rheostat 71. The fixed resistance 97 is shunted by a normally closed back-contact 98 of the overvoltage relay OV. This resistance 97 is used for the purpose of initially slightly reducing the speed of the pump-motor 10, or, in general, slightly reducing the rate of fuel-input into the gas turbine GT, when the master controller MC is first moved backwardly from its idle-position to its low-idle position. Thereupon, as soon as the overvoltage relay OV is adequately energized by the diesel generator DG, it opens this back-contact 98 and reduces the fuel-input into the turbine, thus slightly reducing the speed of the turbine. Thereupon, the speed-responsive piston 70 responds to this reduced turbine-speed by inserting more resistance in the rheostat 71 in the circuit of the pump-motor 10, thereby still further reducing the turbine-speed. This process continues until the speed of the turbine can be no further reduced by the speed-responsive rheostat 71.

On the other hand, when the master controller MC is returned from its low-idle position to its idle-position, the overvoltage relay-circuit 76 is deenergized, and the overvoltage back-contact 98 recloses, thereby shorting out the fixed resistance 97, sending more fuel-oil into the gas turbine GT, and starting an increment in the speed of the gas turbine, which now operates, through the speed-responsive piston 70, to begin to cut out some of the resistance of the rheostat 71 in the circuit of the pump-motor 10, thereby initiating a restoration of the pump-motor speed to its normal full-speed value.

It will be noted that this speed-control of the pump-motor 10, or, in general, the control of the rate of fuel-supply to the gas turbine GT, is gradual, both in the rate-reducing process and in the rate-restoring or increasing process, thereby avoiding sudden changes which might interfere with the successful control of the gas turbine during the process of changing it from its normal idling speed to its low-speed idling-condition, and back again.

Passing over the energizing-circuits for the diesel-start switch DS and the diesel-regulator magnet DR, we come, next, to a positive battery circuit 100, which is connected, through a manual switch 101, to the operating magnet SDV of the shutdown valve SDV, which operates to shut off the fuel-supply to the diesel engine D. The energizing circuit for this shutdown valve STV is continued through a conductor 102 to a make-contact 103 of the idle-speed relay ISR, and thence to the negative battery-terminal (—). When the manual switch 101 is closed, the idle-speed relay-contact 103 energizes the shutdown valve SDV, and thereafter keeps it energized, when the gas turbine GT reaches substantially its normal idling speed. When it is desired that the diesel engine D of the auxiliary power-plant D—DG should continue in operation, as for the purpose of operating certain auxiliaries which are not illustrated, the operator may open the switch 101, which prevents the operation of the shutdown valve SDV.

The next positive battery-circuit 104 is connected to the operating coil ISR of the idle-speed relay ISR, the circuit of which is continued, to the negative battery-terminal (—), through the speed-responsive contact S4 which closes when the gas turbine GT reaches substantially its normal idling speed.

The gas-turbine starting-button GTB appears next, in the drawing. It makes a contact from the positive battery-terminal (+) to a circuit 105, and thence to a back-contact 106 of the idle-speed relay ISR, and thence to a circuit 107 which energizes the operating coil STR of the starting-relay STR. Thus, when the gas-turbine button GTB is depressed, it energizes the starting-relay STR, and keeps it energized until the idle-speed relay ISR picks up its back-contact 106 when the turbine attains its normal idling speed. The manner in which the starting-relay STR causes the turbine to start will be explained hereinafter.

A positive battery-circuit 108 is connected through a back-contact 109 of the exciter-field relay EF and a back-contact 110 of the idle-speed relay ISR, to a conductor 111, which continues on, through a make-contact 112 of the overvoltage relay OV, to a conductor 113. This conductor 113 is connected to the operating-coil D1 of the diesel-generator switch D1, the energizing circuit of which is continued through a back-contact 114 of the resistance-shunting relay PX to the negative battery-terminal (—). The three back-contacts 109, 110 and 114 make certain, respectively, that the four-pole exciter-field 13 is not energized, that the turbine has not substantially attained its idling speed, and that the special series resistance RX is not short-circuited, at the time when the diesel-generator switch D1 is energized for the purpose of connecting the diesel generator DG to the main generator G, to operate the latter as a motor for the purpose of either starting the gas turbine GT or assisting its operation of its low-idling speed.

The overvoltage-relay contact 112 energizes the diesel-generator switch D1 when the latter is to be used for the purpose of causing the auxiliary power-plant D—DG to assist in the driving of the gas turbine GT during its low-speed idling-operation in accordance with my present invention. This is because the energizing-circuit 76 of the overvoltage relay OV is completed only when the master controller MC is in its low-idle position, which closes the contact-segment 32. When the master controller is in its low-idle position, it also closes the contact-segment 33, which energizes the circuit 83 of the diesel-starting contactor DS, which starts the auxiliary power plant D—DG if it is not already running. When the auxiliary power-plant D—DG is operating at its normal low-idling speed, as controlled by the governor GOV$_d$ in the deenergized position of the diesel-regulator DR, the diesel-generator DG develops sufficient voltage to pick up the overvoltage relay OV, which thereupon closes its make-contact 112 which energizes the diesel-generator switch D1.

The overvoltage relay-contact 112 is shunted by two other make-contacts, namely a make-contact 115 of the starting-relay STR, and a holding-circuit make-contact 116 of the diesel-generator switch D1. The STR contact 115 energizes the diesel-generator switch D1 when the starting-relay STR is energized for the purpose of starting up the gas turbine GT when it is first started. The hold-circuit contact 116 maintains the energization of the diesel-generator switch D1 until the gas turbine GT substantially reaches its normal idling speed, which operates the speed-switch S4, and through it the idle-speed relay ISR, which thereupon opens its back contact 110 in the energizing-circuit of the diesel-generator switch D1.

A positive battery-circuit 120 is connected, through a make-contact 121 of the idle-speed relay ISR, to a circuit 122 which energizes an atomizing-air transfer-relay AAT. A positive battery-circuit 123 is also provided, for energizing an air-valve magnet V80 in series with a make-contact 124 of the transfer-relay AAT. This positive battery-circuit 123 is also used to energize an air-valve magnet V40 in series with a back-contact 125 of the transfer-relay AAT.

The atomizing-air transfer-relay AAT and the two air-valves V80 and V40 are needed for the purpose of controlling the pressure of the atomizing-air which is fed through a pipe 126 to the burner 8, to atomize the fuel-oil which is admitted to the combustion-chamber 6 of the gas turbine GT. During the normal operation of the gas turbine GT, either during its normal idling operation or during its power-delivering operation, a certain amount of atomizing air-pressure is used, which may be taken, for purposes of illustration, as 80 pounds per square inch, although it is to be understood that I am not to be limited to any particular figure. This atomizing air-pressure is needed for the purpose of properly atomizing the fuel-oil as it is being injected into the combustion chamber 6. When the gas turbine is operated at a reduced or low idling-speed, in accordance with my present invention, the rate of flow of the fuel-oil which is fed into the combustion chamber 6 is reduced considerably below any previously used fuel-rate, and the turbine-speed is also reduced considerably below the normal self-sustaining idling-speed which has been heretofore known.

Under these low-idling circumstances, I have found it desirable, at least in one form of embodiment of my invention, to also reduce the pressure of the atomizing air in the pipe 126, in order to prevent the blowing out of the atomized fuel-oil in the combustion-chamber 6.

As a conventional indication of a means of suitably reducing the pressure of the atomizing air in the pipe 126, during my low-speed idling of the turbine, I have shown a source of high-pressure atomizing-air at 127, and I step down the pressure of this air, in two branch-circuits, through two air-pressure regulators AR40 and AR80, for reducing this air-pressure respectively to 40 pounds per square inch and 80 pounds per square inch, for example. The 40-pound air is controlled by the air-valve V40, which is connected between the 40-pound regulator AR40 and the atomizing-air pipe 126, this valve V40 being closed, as shown, when its valve-magnet V40 is deenergized, that is, when the positive battery-switch 128 is open, in the upper left-hand corner of the drawing. The 80-pound air is similarly controlled by the air-valve V80, which is connected between the 80-pound regulator AR80 and the atomizing-air pipe 126, this valve V80 being also closed in the deenergized condition of its valve-magnet V80.

A positive battery-circuit 130 leads to the diesel-starting contact DS, which energizes the positive terminal of the diesel-starting motor SM, the negative terminal of which is connected to the negative battery-terminal (—).

The series-field terminal SF of the exciter E has branch-circuits extending therefrom to the left and to the right. The left-hand branch from the circuit SF extends through the field-rheostat 17 to the self-excited two-pole field 14, and thence to the negative exciter-terminal E—. The right-hand branch of the circuit SF extends through a back-contact 131 of the starting-relay STR to the positive exciter-terminal E+. This right-hand branch from the conductor SF also has another branch-circuit which is connected, through a make-contact 132 of the starting-relay STR, to the negative exciter-terminal E—, which is also the negative terminal of the main generator field GF.

The result of these connections is that, during normal times, when the starting-relay STR is not energized, the self-excited two-pole field 14 is energized through a circuit which can be traced from E+ to 131 to 17 to 14, and back to E—. At the same time, the main generator field GF is connected in a circuit which may be traced from the positive generator-terminal G+ through the field GF to the negative exciter-terminal E—, and thence through the exciter-armature E to the positive exciter-circuit E+, the normally closed starting-relay contact 131, and the series-field conductor SF. Whenever the resistance-shunting contactor PX is energized, this exciting-circuit is continued from the conductor SF through the PX contact, and back to the positive generator circuit G+. When the resistance-shunting contactor PX is open or deenergized, as shown, the exciting circuit for the main generator field GF is completed from the conductor SF to the negative terminal of the series-circuit resistance RX, the positive terminal of which is connected to the positive generator-terminal G+, so that, under these conditions, the main generator field GF receives an excitation which is equal to the voltage-drop through the series-circuit resistor RX, minus the relatively small voltage of the exciter E.

At the time when the main turbine GT is being started, and only at such a time, the starting-relay STR is energized, in which case its back-contact 131 opens, and its make-contact 132 closes. The open back-contact 131 open-circuits the exciter-armature E, and the closed make-contact 132 bypasses the exciter-armature in completing the energizing-circuit for the main generator field GF, so that this field-winding GF is now connected in a shunt-circuit which is directly across the terminals of the series resistance RX, as may be traced from the positive generator terminal GT through the generator-field winding GF, to the contact 132, and thence to the conductor SF which constitutes the negative terminal of the series resistance RX.

The principal novel feature of my invention concerns the shifting of the master controller between the normal "idle" position and my special added "low idle" position, and back again. When the controller-handle is notched back from the "idle" position to the "low idle" position, the contact-segment 31 energizes the air-valve V18, which shuts off the supply of compressed air to the fuel-transfer controlling-valve VF, which thereupon forces the fuel-transfer cylinder FT to return to its normal light-oil position as illustrated, without waiting for any reduction of the turbine-speed to an abnormally low idling-value which would suitably reduce the air-pressure in the compressor-pressure pipe 54. At the same time, the lowermost contact-segment 33 of the controller energizes the circuit 83 of the diesel-starting contactor DS, which starts the diesel engine D unless the engine is already running, in which case the diesel-lube switch-contact DL will be open already. At the same time, the second contact-segment 32 of the master controller will energize the operating-circuit 76 of the overvoltage relay OV.

The overvoltage relay OV picks up when the voltage of the diesel generator DG reaches substantially its normal value which it has when it is being used to assist in the driving of the turbine GT at its low-idling speed. This overvoltage relay OV picks up and closes its make-contact 112, and opens its back-contact 98. The overvoltage relay-contact 112 energizes the diesel-generator switch D1 which thereupon connects the diesel generator as a source of supply for the main generator G, which is now operating as a series-shunted motor, to assist in driving the gas turbine GT. At the same time, the overvoltage relay-contact 98 opens and slightly reduces the rate of fuel-input into the gas turbine GT, enough to cause the turbine-speed to drop slightly, even when the turbine-proper 7 is being assisted by the diesel generator DG. The reduced turbine-speed operates, through the speed-responsive piston 70, to still further reduce the fuel-input into the turbine, thus starting a chain of gradual fuel-reduction which finally brings the turbine down to its low-idling speed, as previously described.

The reason why it is desirable to reduce the fuel-input gradually, in the turbine GT, is to make sure that the fuel-pressure in the burner 8 is always somewhat above the air-pressure which is produced in the compressor-part 5 of the turbine-assembly, and this compressor-pressure reduces only slowly, as the turbine-speed reduces from its normal idling-value to its special low-idling value which I have provided.

It is convenient to have the diesel generator DG deliver a limited fixed or constant amount of driving-power to the main engine or turbine GT during this low-idling operation. Such constant-power operation is usually provided by the conventional diesel-governor GOVd when the governor-setting is left alone. When the governor-output is maintained at substantially a constant horsepower-level, the loading on the diesel-generator DG and the now-motoring main generator G is also automatically kept substantially constant, thus avoiding the necessity for complicated electrical controls. At the same time, the generator G is operating as a series-shunted motor, because its field-winding GF is energized across the terminals of the series resistance RX, thus giving the generator a series-motor characteristic which is ideal for absorbing the constant-horsepower output of the auxiliary power-plant D—DG.

It will be noted that the main generator G cannot deliver power to the traction-motor A1, which is its major useful-load device, during this low-speed idling-operation of the turbine GT, and this circumstance is provided for, both by the fact that the master controller MC is not in any of its power-positions 1 to 8, and by the EF interlock 109, which makes sure that the exciter-field relay EF is deenergized, which, in turn, makes sure that the exciter-field relay-contact 82 is deenergizing the power-switch or contactor P.

It will be noted that the power-cost, of operating the diesel engine D during the low-speed idling of the main turbine GT, is much less than the cost of maintaining the normal idling-speed of the turbine, at its high normal idling speed which is necessary to enable its turbine-proper 7 to generate enough power to drive its own air-compressor 5.

It is further noted that, during this low-idling operation of the turbine, the fuel-supply to the turbine is not altogether cut off, but a certain small amount of fuel is preferably left burning in the combustion-chamber 6, so as to maintain the combustion chamber at substantially its normal safe operating-temperature, so that no heating-up period will be required at the end of the stand-by period or station waiting-time during which the low-idling operation was employed.

When the locomotive engineman is ready to start his locomotive again, after a low-idling period, he returns his controller-handle to the idle-position, and leaves it there for a minute or less, or until the turbine again reaches its normal idling speed, after which the engineman can advance the controller to any of the on-positions 1 to 8 in the normal way.

As soon as the engineman returns the master controller to the idle-position, after a low-idling operation, the contact-segment 34 completes the energizing-circuit 78 which comes from the magnet-valve DR of the diesel-regulator DR, causing the latter to upwardly adjust the setting of the diesel-governor GOVd, which causes the diesel engine D to speed up to a considerably higher speed. This control is preferably provided, in order that the auxiliary power plant D—DG may supply driving-power at a considerably increased rate, to the gas turbine GT, while the turbine is being speeded up from its low-idling speed to its normal idling-speed, thereby reducing the waiting-time which the engineman must observe before he can use the turbine GT to supply useful power in the normal way.

At the same time when the master controller is returned from its low-idle position to its idle-position, the contact-segment 32 is opened, thus opening the energizing-circuit 76 of the overvoltage relay OV, which immediately drops out and closes its top contact 98, thus shorting out the resistance 97 in the circuit of the main pump-motor 10, causing an immediate small increase in the rate of fuel-supply to the gas turbine GT. The speed of the gas turbine thereupon begins to increase, under the double impetus of the increased speed or power-setting of the diesel engine D and the increased fuel-supply to its own burner 8. This increased engine-speed operates through the piston 70 to cause a progressive decrease or cutting-out of the resistance of the rheostat 71 in the pump-motor circuit. In this manner, the fuel-supply, and hence the fuel input-pressure, into the gas turbine GT is gradually increased, as the compressor-pressure of the turbine is increasing, so as to prevent an excessive differential between the fuel-pressure and the compressor-pressure, which would cause an excessive fuel-inlet temperature in the combustion-chamber 6.

The preferred regulation of the pressure of the atomizing air in the pipe 126 has already been described, and need not be here reviewed.

The same auxiliary power-plant D—DG which I use for assisting in the driving of the turbine GT during its low-idling operation will perhaps always be used, also, as the means for starting up the turbine GT in the first place. In the simple illustrative form of embodiment of the invention, which is shown in the drawing, I do not use an automatic diesel-starting means, when the turbine-starting button GTB is depressed, as I do in the case in which a low-idling operation is called for by the master controller MC, although it will be understood that a similar control could be connected to the starting-relay STR, if desired, for energizing the energizing-circuit 83 of the diesel-starting contactor DS.

In the apparatus as illustrated, therefore, before starting the main gas turbine GT, it is necessary for the operator first to manually start the diesel-engine D, which is accomplished by means of the diesel-starting push button DSB. With the diesel engine D in its operating condition, the gas-turbine starting-button GTB can now be depressed, thus energizing the starting-relay STR, which is used for the sole purpose of starting the gas turbine GT. The starting-relay contact 79 picks up the diesel-regulator magnet DR which adjusts the diesel-governor $GOV_d$ to its high-speed setting, for the quick starting of the turbine GT. The starting-relay contact 115 energizes the diesel-generator switch D1 which connects the diesel generator DG to the main generator G. The starting-relay contacts 131 and 132 bypass the exciter-armature E so as to protect the same against the high inrush starting-current, leaving the main generator field GF connected in shunt across the series temporary-duty resistance RX in the manner set forth in the previously-mentioned Finch application. The starting-relay contact 87 energizes the vibrating relay VIB and the spark-plug transformer 89, until the fuel is ignited in the combustion-chamber 6 and the spark-plug energizing-circuit is broken at 92'.

When the gas turbine GT is turning over fast enough to admit of receiving a fuel-supply, the speed-switch S2 closes and energizes the main pumping-motor 10, which initiates the fuel-supply to the gas turbine GT. When the turbine reaches substantially its normal idling-speed, the speed-switch S4 closes and energizes the idle-speed relay ISR, which thereupon interrupts the starting-circuits, and energizes the atomizing-air transfer-relay AAT, which energizes the air-valve V80 to open the same and apply 80-pound atomizing-air to the burner 8. The idle-speed relay ISR also deenergizes the diesel-regulator magnet DR, and also, assuming that the manual shutdown-switch 101 is closed, energizes the shutdown-valve STV to shut off the fuel-supply to the diesel engine D.

These starting-arrangements, for initially starting the main engine GT, are not a part of my present invention, except that my auxiliary power-plant D—DG will be used for such starting-purposes, as well as for the driving-assistance during the low-idling operation of the main engine GT. Contrariwise, it may be said that I make use of the same auxiliary power-plant which is commonly provided for starting the main engine, except that I preferably provide a diesel-regulator means DR for reducing the speed of this auxiliary plant during its service as an auxiliary turbine-driving means during my low-speed idling-operation of the turbine.

While I have described my invention in but a single, very much simplified, illustrative form of embodiment, I wish it to be understood that most of the details are subject to considerable variation, by the substitution of equivalent elements, within the scope of my invention, and that some elements could be omitted, and other, unillustrated, elements would certainly be added, in any practical system using my invention.

I claim as my invention:

1. In combination, a fuel-consuming engine which normally requires a certain costly idling-speed fuel-input to maintain a desirable self-sustaining idling speed; a means for increasing the fuel-input substantially above the amount which is necessary for said desirable self-sustaining idling speed, when said engine is delivering power; a major useful-load device which is driven by the power produced by said engine when said engine is receiving said increased fuel-input; a source of external power which is cheaper than the operation of said engine at said desirable self-sustaining idling speed; a low-idling means, for operating said engine at an abnormally low idling speed, substantially below said desirable self-sustaining idling speed, with external-power assistance, with a reduced fuel-input, and with substantially no power-delivery to said major useful-load device, said low-idling means comprising: a means for decreasing said fuel-input to a point which is a substantial amount which is nevertheless substantially below the normal idling-speed fuel-input, and a means for using said source of external power to supply sufficient driving-power to said engine to maintain said abnormally low idling speed under said conditions; and an idling-restoring means, for discontinuing the low-idling operation of the engine, said idling-restoring means comprising: a means for increasing said fuel-input, while still temporarily using said source of external power to supply driving-power to said engine, and a means for finally discontinuing the application of driving-power to said engine from said source of external power.

2. In combination, a fuel-consuming engine which normally requires a certain costly idling-speed fuel-input to maintain a desirable self-sustaining idling speed; a means for increasing the fuel-input substantially above the amount which is necessary for said desirable self-sustaining idling speed, when said engine is delivering power; a major useful-load device which is driven by the power produced by said engine when said engine is receiving said increased fuel-input; a source of external power which is cheaper than the operation of said engine at said desirable self-sustaining idling speed; a low-idling means for operating said engine at an abnormally low idling speed, substantially below said desirable self-sustaining idling speed, with external-power assistance, with a reduced fuel-input, and with substantially no power-delivery to said major useful-load device, said low-idling means comprising: a means for decreasing said fuel-input to a point which is a substantial amount which is nevertheless substantially below the normal idling-speed fuel-input, and a means for using said source of external power to supply a limited amount of driving-power to said engine to maintain said abnormally low idling speed under said conditions; and an idling-restoring means, for discontinuing the low-idling operation of the engine, said idling-restoring means comprsing: a means for increasing said fuel-input, a means for temporarily using said source of external power to supply an increased amount of driving-power to said engine, and a means for finally discontinuing the application of driving-power to said engine from said source of external power.

3. In combination, a fuel-consuming engine which has a combustion-chamber in which fuel is continuously burned, said engine normally requiring a certain costly idling-speed fuel-input to maintain a desirable self-sustaining idling speed; a means for increasing the fuel-input substantially above the amount which is necessary for said desirable self-sustaining idling speed, when said engine is delivering power; a major useful-load device which is driven by the power produced by said engine when said engine is receiving said increased fuel-input; a source of external power which is cheaper than the operation of said engine at said desirable self-sustaining idling speed; a low-idling means, for operating said engine at an abnormally low idling speed, substantially below said desirable self-sustaining idling speed, while still maintaining combustion in the combustion-chamber, but with external-power assistance, with a reduced fuel-input, and with substantially no power-delivery to said major useful-load device, said low-idling means comprising: a means for decreasing said fuel-input to a point which is a substantial amount which is nevertheless substantially below the normal idling-speed fuel-input, and a means for using said source of external power to supply sufficient driving-power to said engine to maintain said abnormally low idling speed under said conditions; and an idling-restoring means, for discontinuing the low-idling operation of the engine, said idling-restoring means comprising: a means for increasing said fuel-input, while still temporarily using said source of external power to supply driving-power to said engine, and a means for finally discontinuing the application of driving-power to said engine from said source of external power.

4. In combination, a fuel-consuming engine which has a combustion-chamber in which atomized liquid fuel is continuously burned, said engine normally requiring a certain costly idling-speed fuel-input to maintain a desirable self-sustaining idling speed; a means for increasing the fuel-input substantially above the amount which is necessary for said desirable self-sustaining idling speed, when said engine is delivering power; a major useful-load device which is driven by the power produced by said engine when said engine is receiving said increased fuel-input; a source of pressurized atomizing-air for atomizing the liquid fuel which enters said combustion-chamber; a source of external power which is cheaper than the operation of said engine at said desirable self-sustaining idling speed; a low-idling means, for operating said engine at an abnormally low idling speed, substantially below said desirable self-sustaining idling speed, while still maintaining combustion in the combustion-chamber, but with external-power assistance, with a reduced fuel-input, and with substantially no power-delivery to said major useful-load device, said low-idling means comprising: a means for gradually decreasing said fuel-input to a point which is a substantial amount which is nevertheless substantially below the normal idling-speed fuel-input, and a means for using said source of external power to supply sufficient driving-power to said engine to maintain said abnormally low idling speed under said conditions; and an idling-restoring means, for discontinuing the low-idling operation of the engine, said idling-restoring means comprising: a means for gradually increasing said fuel-input, while still temporarily using said source of external power to supply driving-power to said engine, and a means for finally discontinuing the application of driving-power to said engine from said source of external power.

5. In combination, a fuel-consuming engine which has a combustion-chamber in which atomized liquid fuel is continuously burned, said engine normally requiring a certain costly idling-speed fuel-input to maintain a desirable self-sustaining idling speed; a means for increasing the fuel-input substantially above the amount which is necessary for said desirable self-sustaining idling speed, when said engine is delivering power; a major useful-load device which is driven by the power produced by said engine when said engine is receiving said increased fuel-input; a source of pressurized atomizing-air for atomizing the liquid fuel which enters said combustion-chamber; a source of external power which is cheaper than the operation of said engine at said desirable self-sustaining idling speed; a low-idling means, for operating said engine at an abnormally low idling speed, substantially below said desirable self-sustaining idling speed, while still maintaining combustion in the combustion-chamber, but with external-power assistance, with a reduced fuel-input, and with substantially no power-delivery to said major useful-load device, said low-idling means comprising: a means for gradually decreasing said fuel-input to a point which is a substantial amount which is nevertheless substantially below the normal idling-speed fuel-input, and a means for using said source of external power to supply a predetermined limited amount of driving-power to said engine to maintain said abnormally low idling speed under said conditions; and an idling-restoring means, for discontinuing the low-idling operation of the engine, said idling-restoring means comprising: a means for gradually increasing said fuel-input, a means for temporarily using said source of external power to supply an increased amount of driving-power to said engine, and a means for finally discontinuing the application of driving-power to said engine from said source of external power.

6. In combination, a fuel-consuming engine which has a combustion-chamber in which atomized liquid fuel is continuously burned, said engine normally requiring a certain costly idling-speed fuel-input to maintain a desirable self-sustaining idling speed; a means for increasing the fuel-input substantially above the amount which is necessary for said desirable self-sustaining idling speed, when said engine is delivering power; a major useful-load device which is driven by the power produced by said engine when said engine is receiving said increased fuel-input; a source of pressurized atomizing-air for atomizing the liquid fuel which enters said combustion-chamber; a source of external power which is cheaper than the operation of said engine at said desirable self-sustaining idling speed; a speed-responsive means, effective during the engine-speed range between the desirable self-sustaining idling speed and an abnormally low idling speed, for gradually decreasing said fuel-input to a point which is a substantial amount which is nevertheless substantially below the normal idling-speed fuel-input, in response to decreasing engine-speeds, and for gradually increasing said fuel-input during increasing engine-speeds; and a low-idling means, for operating said engine at said abnormally low idling speed, substantially below said desirable self-sustaining idling speed, with external-power assistance, with a reduced fuel-input, and with substantially no power-delivery to said major useful-load device, said low-idling means comprising: a means for giving said fuel-input an initial reduction which is sufficient to enable the fuel-decreasing function of said speed-responsive means to become effective, and a means for using said source of external power to supply sufficient driving-power to said engine to maintain said abnormally low idling speed under said conditions; and an idling-restoring means, for discontinuing the low-idling operation of the engine, said idling restoring means comprising: a means for giving said fuel-input an initial increase which is sufficient to enable the fuel-increasing function of said speed-responsive means to become effective, while still temporarily using said source of external power to supply driving-power to said engine, and a means for finally discontinuing the application of driving-power to said engine from said source of external power.

7. In combination, a fuel-consuming engine which has a combustion-chamber in which atomized liquid fuel is continuously burned, said engine normally requiring a certain costly idling-speed fuel-input to maintain a desirable self-sustaining idling speed; a means for increasing the fuel-input substantially above the amount which is necessary for said desirable self-sustaining idling speed, when said engine is delivering power; a major useful-load device which is driven by the power produced by said engine when said engine is receiving said increased fuel-input; a source of pressurized atomizing-air for atomizing the liquid fuel which enters said combustion-chamber; a source of external power which is cheaper than the operation of said engine at said desirable self-sustaining idling speed; a speed-responsive means, effective during the engine-speed range between the desirable self-sustaining idling speed and an abnormally low idling speed, for gradually decreasing said fuel-input to a point which is a substantial amount which is nevertheless substantially below the normal idling-speed fuel-input, in response to decreasing engine-speeds, and for gradually increasing said fuel-input during increasing engine-speeds; and a low-idling means, for operating said engine at said abnormally low idling speed, substantially below said desirable self-sustaining idling speed, with external-power assistance, with a reduced fuel-input, and with substantially no power-delivery to said major useful-load device, said low-idling means comprising: a means for giving said fuel-input an initial reduction which is sufficient to enable the fuel-decreasing function of said speed-responsive means to become effective, and a means for using said source of external power to supply a predetermined limited amount of driving-power to said engine to maintain said abnormally low idling speed under said conditions; and an idling-restoring means, for discontinuing the low-idling operation of the engine, said idling-restoring means comprising: a means for giving said fuel-input an initial increase which is sufficient to enable the fuel-increasing function of said speed-responsive means to become effective, while still temporarily using said source of external power to supply driving-power to said engine, and a means for finally discontinuing the application of driving-power to said engine from said source of external power.

8. In combination, a fuel-consuming engine which has a combustion-chamber in which atomized liquid fuel is continuously burned, said engine normally requiring a certain costly idling-speed fuel-input to maintain a desirable self-sustaining idling speed; a means for increasing the fuel-input substantially above the amount which is necessary for said desirable self-sustaining idling speed, when said engine is delivering power; a major useful-load device which is driven by the power produced by said engine when said engine is receiving said increased fuel-input; a source of pressurized atomizing-air for atomizing the liquid fuel which enters said combustion-chamber; a pressure-changing means for controlling the pressure of said atomizing-air; a source of external power which is cheaper than the operation of said engine at said desirable self-sustaining idling speed; a low-idling means, for operating said engine at an abnormally low idling speed, substantially below said desirable self-sustaining idling speed, while still maintaining combustion in the combustion-chamber, but with external-power assistance, with a reduced fuel-input, and with substantially no power-delivery to said major useful-load device, said low-idling means comprising: a means for decreasing said fuel-input to a point which is a substantial amount which is nevertheless substantially below the normal idling-speed fuel-input, a means for actuating the pressure-changing means so as to reduce the pressure of the atomizing-air, and a means for using said source of external power to supply sufficient driving-power to said engine to maintain said abnormally low idling speed under said conditions; and an idling-restoring means, for discontinuing the low-idling operation of the engine, said idling-restoring means comprising: a means for increasing said fuel-input, while still temporarily using said source of external power to supply driving-power to said engine, a means for finally discontinuing the application of driving-power to said engine from said source of external power, and a means for actuating the pressure-changing means so as to increase the pressure of the atomizing-air.

9. In combination, a fuel-consuming engine which normally requires a certain costly idling-speed fuel-input to maintain a desirable self-sustaining idling speed; a means for increasing the fuel-input substantially above the amount which is necessary for said desirable self-sustaining idling speed, when said engine is delivering power; a major useful-load device which is driven by the power produced by said engine when said engine is receiving said increased fuel-input; said engine being of a type which normally operates on a heavy fuel-oil when it is operating with a fuel-input which is equal to, or greater than, said amount which is necessary for said desirable self-sustaining speed, but which has to be started on a lighter fuel-oil, and has to be changed over to said lighter fuel-oil before said engine completely stops; a fuel-selector valve-means, for changing over from one fuel-oil to the other; a source of external power which is cheaper than the operating of said engine at said desirable self-sustaining idling speed, a low-idling means, for operating said engine at an abnormally low idling speed, substantially below said desirable self-sustaining idling speed, with external-power assistance, with a reduced fuel-input, and with substantially no power-delivery to said major useful-load device, said low-idling means comprising: a means for decreasing said fuel-input to a point which is a substantial amount which is nevertheless substantially below the normal idling-speed fuel-input, a means for actuating said fuel-selector valve-means to change from heavy oil to light oil, and a means for using said source of external power to supply sufficient driving-power to said engine to maintain said abnormally low idling speed under said conditions; and an idling-restoring means, for discontinuing the low-idling operation of the engine, said idling-restoring means comprising: a means for increasing said fuel-input, while still temporarily using said source of external power to supply driving-power to said engine, a means for actuating said fuel-selector valve-means to change from light oil to heavy oil, and a means for finally discontinuing the application of driving-power to said engine from said source of external power.

10. In combination, a main fuel-consuming engine which normally requires a certain costly idling-speed fuel-input to maintain a desirable self-sustaining idling speed; a means for increasing the fuel-input substantially above the amount which is necessary for said desirable self-sustaining idling speed, when said main engine is delivering power; a major useful-load device which is driven by the power produced by said main engine, when said main engine is receiving said increased fuel-input; an auxiliary fuel-consuming engine which is capable of more economically supplying the power necessary to drive said main engine at an abnormally low idling speed, substantially below the normal idling speed of the main engine; a low-idling means, for operating said main engine at said low-idling speed, with external-power assistance, with a reduced fuel-input, and with substantially no power-delivery to said major useful-load device, said low-idling means comprising: a means for starting said auxiliary engine if it is not already running, an auxiliary drive means, responsive jointly to an operative low-idling condition of said low-idling means and a satisfactorily operative running-condition of said auxiliary engine, for decreasing the main-engine fuel-input to a point which is a substantial amount which is nevertheless substantially below the normal idling-speed fuel-input, and for using said auxiliary engine to supply sufficient driving-power to said main engine to maintain said abnormally low idling speed under said conditions; and an idling-restoring means, for discontinuing the low-idling operation of the main engine, said idling-restoring means comprising: a means for increasing the main-engine fuel-input, while still temporarily using said auxiliary engine to supply driving-power to said main engine, and a means for finally discontinuing the application of driving-power to said main engine from said auxiliary engine.

11. In combination, a main fuel-consuming engine which normally requires a certain costly idling-speed fuel-input to maintain a desirable self-sustaining idling speed; a means for increasing the fuel-input substantially above the amount which is necessary for said desirable self-sustaining idling speed, when said main engine is delivering power; a major useful-load device which is driven by the power produced by said main engine, when said main engine is receiving said increased fuel-input; an auxiliary fuel-consuming engine which is capable of more economically supplying the power necessary to drive said main engine at an abnormally low idling speed, substantially below the normal idling speed of the main engine; a low-idling means, for operating said main engine at said low-idling speed, with external-power assistance, with a reduced fuel-input, and with substantially no power-delivery to said major useful-load device, said low-idling means comprising: a means for starting said auxiliary engine if it is not already running, an auxiliary drive means, responsive jointly to an operative low-idling condition of said low-idling means and a satisfactorily operative running-condition of said auxiliary engine, for decreasing the main-engine fuel input to a point which is a substantial amount which is nevertheless substantially below the normal idling-speed fuel-input, and for using said auxiliary engine to supply a limited amount of driving-power to said main engine to maintain said abnormally low idling speed under said conditions; and an idling-restoring means, for discontinuing the low-idling operation of the main engine, said idling-restoring means comprising: a means for increasing the main-engine fuel-input, a means for temporarily using said auxiliary engine to supply an increased amount of driving-power to said main engine, and a means for finally discontinuing the application of driving-power to said main engine from said auxiliary engine.

References Cited in the file of this patent
UNITED STATES PATENTS 2,535,488   Dros _____ Dec. 26, 1950